US007191394B1

(12) United States Patent
Ardeleanu et al.

(10) Patent No.: US 7,191,394 B1
(45) Date of Patent: Mar. 13, 2007

(54) AUTHORING ARBITRARY XML DOCUMENTS USING DHTML AND XSLT

(75) Inventors: Adriana Ardeleanu, Redmond, WA (US); Jean D. Paoli, Kirkland, WA (US); Stephen J. Mooney, Seattle, WA (US); Suryanarayanan V. Raman, Redmond, WA (US); Rajesh K. Jha, Issaquah, WA (US); Prakash Sikchi, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 787 days.

(21) Appl. No.: 09/599,813

(22) Filed: Jun. 21, 2000

(51) Int. Cl.
*G06F 15/00* (2006.01)

(52) U.S. Cl. .................. 715/513; 715/509; 715/530
(58) Field of Classification Search ............. 715/513, 715/500.1, 500, 523; 701/3; 705/14, 52; 706/12; 707/2, 100, 102, 513, 106, 101; 709/220, 204; 716/4; 717/108, 125; 725/47, 725/44; 345/810
See application file for complete search history.

(56) References Cited

U.S. PATENT DOCUMENTS 4,514,800 A    4/1985   Gruner et al.

(Continued)

FOREIGN PATENT DOCUMENTS

EP     0 841 615 A2    5/1998

(Continued)

OTHER PUBLICATIONS

W3C Editor James Clark, XSL Transformation (XSLT) Version 1.0 Publication date Nov. 16, 1999 By W3C (MIT, INRIA, Keio).*

(Continued)

*Primary Examiner*—William Bashore
*Assistant Examiner*—Quoc A. Tran
(74) *Attorney, Agent, or Firm*—Lee & Hayes, PLLC

(57) ABSTRACT

Methods and systems of authoring XML using DHTML views and XSLT are described. Various user interfaces can be automatically or semi-automatically provided in a DHTML view that enable a user to interact with the DHTML view. The interfaces, some of which are termed "in document" interfaces, permit a user to interact with a DHTML view and have those interactions automatically made to a corresponding XML document that describes data that is associated with the DHTML view. Presentation of the various in document interfaces takes place by considering not only an XML schema (of which the XML document is an instance), but an XSL-T (XSLT transformation) that was utilized to transform the XML document into the DHTML view. In addition, the notion of a crystal is introduced and is used to map interactions with a DHTML view directly back to a corresponding XML document. A crystal, in a basic form, includes one or more behaviors and associated XSL-T. The crystals are used to transform XML into the DHTML views. The behaviors of a crystal are defined to be data-shape specific or dependent, with the data shape being defined by the XML document. The behavior is not necessarily dependent upon any schema, data or tags. Because of its data-shape dependent nature, crystals can be packaged for reuse with various XML documents which have no relation to one another other than a shape that is defined by the XML. Behaviors can be attached to DHTML tags that are generated by the XSL-T. The behaviors ensure that user interactions with the DHTML view are mapped directly back to the XML document. In this way, the XML document can be authored to reflect the changes that are made to the DHTML view by the user.

16 Claims, 5 Drawing Sheets

U.S. PATENT DOCUMENTS

| | | |
|---|---|---|
| 4,641,274 A | 2/1987 | Swank |
| 4,674,040 A | 6/1987 | Barker et al. |
| 4,723,211 A | 2/1988 | Barker et al. |
| 4,739,477 A | 4/1988 | Barker et al. |
| 4,815,029 A | 3/1989 | Barker et al. |
| 4,847,749 A | 7/1989 | Collins et al. |
| 4,910,663 A | 3/1990 | Bailey |
| 4,933,880 A | 6/1990 | Borgendale et al. |
| 4,962,475 A | 10/1990 | Hernandez et al. |
| 5,072,412 A | 12/1991 | Henderson, Jr. et al. |
| 5,179,703 A | 1/1993 | Evans |
| 5,182,709 A | 1/1993 | Makus |
| 5,187,786 A | 2/1993 | Densmore et al. |
| 5,191,645 A | 3/1993 | Carlucci et al. |
| 5,195,183 A | 3/1993 | Miller et al. |
| 5,204,947 A | 4/1993 | Bernstein et al. |
| 5,206,951 A | 4/1993 | Khoyi et al. |
| 5,218,672 A | 6/1993 | Morgan et al. |
| 5,237,680 A | 8/1993 | Adams et al. |
| 5,249,275 A | 9/1993 | Srivastava |
| 5,274,803 A | 12/1993 | Dubin et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushim |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,381,547 A | 1/1995 | Flug et al. |
| 5,390,325 A | 2/1995 | Miller |
| 5,396,623 A | 3/1995 | McCall et al. |
| 5,408,665 A | 4/1995 | Fitzgerald |
| 5,410,688 A | 4/1995 | Williams et al. |
| 5,412,772 A | 5/1995 | Monson |
| 5,434,975 A | 7/1995 | Allen |
| 5,436,637 A | 7/1995 | Gayraud et al. |
| 5,440,744 A | 8/1995 | Jacobson et al. |
| 5,446,842 A | 8/1995 | Schaeffer et al. |
| 5,459,865 A | 10/1995 | Heninger et al. |
| 5,481,722 A | 1/1996 | Skinner |
| 5,504,898 A | 4/1996 | Klein |
| 5,517,655 A | 5/1996 | Collins et al. |
| 5,535,389 A | 7/1996 | Elder et al. |
| 5,542,070 A | 7/1996 | LeBlanc et al. |
| 5,550,976 A | 8/1996 | Henderson et al. |
| 5,551,035 A | 8/1996 | Arnold et al. |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,602,996 A | 2/1997 | Powers, III et al. |
| 5,608,720 A | 3/1997 | Biegel et al. |
| 5,627,979 A | 5/1997 | Chang et al. |
| 5,630,126 A | 5/1997 | Redpath |
| 5,634,121 A | 5/1997 | Tracz et al. |
| 5,640,544 A | 6/1997 | Onodera et al. |
| 5,659,729 A | 8/1997 | Nielsen |
| 5,664,178 A | 9/1997 | Sinofsky |
| 5,669,005 A | 9/1997 | Curbow et al. |
| 5,682,536 A | 10/1997 | Atkinson et al. |
| 5,689,703 A | 11/1997 | Atkinson et al. |
| 5,706,501 A | 1/1998 | Horikiri et al. |
| 5,717,939 A | 2/1998 | Bricklin et al. |
| 5,721,824 A | 2/1998 | Taylor |
| 5,740,439 A | 4/1998 | Atkinson et al. |
| 5,742,504 A | 4/1998 | Meyer et al. |
| 5,745,683 A | 4/1998 | Lee et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,784,555 A | 7/1998 | Stone |
| 5,798,757 A | 8/1998 | Smith |
| 5,801,701 A | 9/1998 | Koppolu et al. |
| 5,802,304 A | 9/1998 | Stone |
| 5,806,079 A | 9/1998 | Rivette et al. |
| 5,815,830 A | 9/1998 | Anthony |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,854,630 A | 12/1998 | Nielsen |
| 5,859,973 A | 1/1999 | Carpenter et al. |
| 5,862,372 A | 1/1999 | Morris et al. |
| 5,864,819 A | 1/1999 | De Armas et al. |
| 5,907,704 A | 5/1999 | Gudmundson et al. |
| 5,911,776 A | 6/1999 | Guck |
| 5,915,112 A | 6/1999 | Boutcher |
| 5,922,072 A | 7/1999 | Hutchinson et al. |
| 5,929,858 A | 7/1999 | Shibata et al. |
| 5,940,075 A | 8/1999 | Mutschler, III et al. |
| 5,950,010 A | 9/1999 | Hesse et al. |
| 5,956,481 A | 9/1999 | Walsh et al. |
| 5,960,199 A | 9/1999 | Brodsky et al. |
| 5,963,964 A | 10/1999 | Nielsen |
| 5,982,370 A | 11/1999 | Kamper |
| 5,987,480 A | 11/1999 | Donohue et al. |
| 5,991,710 A | 11/1999 | Papineni et al. |
| 5,995,103 A | 11/1999 | Ashe |
| 5,999,740 A | 12/1999 | Rowley |
| 6,014,135 A | 1/2000 | Fernandes |
| 6,016,520 A | 1/2000 | Facq et al. |
| 6,018,743 A | 1/2000 | Xu |
| 6,026,379 A | 2/2000 | Haller et al. |
| 6,026,416 A | 2/2000 | Kanerva et al. |
| 6,031,989 A | 2/2000 | Cordell |
| 6,035,297 A | 3/2000 | Van Huben et al. |
| 6,035,309 A | 3/2000 | Dauerer et al. |
| 6,044,205 A | 3/2000 | Reed et al. |
| 6,052,710 A | 4/2000 | Saliba et al. |
| 6,054,987 A | 4/2000 | Richardson |
| 6,072,870 A | 6/2000 | Nguyen et al. |
| 6,078,326 A | 6/2000 | Kilmer et al. |
| 6,078,327 A | 6/2000 | Liman et al. |
| 6,081,610 A | 6/2000 | Dwork et al. |
| 6,084,585 A | 7/2000 | Kraft et al. |
| 6,088,708 A | 7/2000 | Burch et al. |
| 6,091,417 A | 7/2000 | Lefkowitz |
| 6,094,657 A | 7/2000 | Hailpern et al. |
| 6,097,382 A | 8/2000 | Rosen et al. |
| 6,098,081 A | 8/2000 | Heidorn et al. |
| 6,108,637 A | 8/2000 | Blumenau |
| 6,108,783 A | 8/2000 | Krawczyk et al. |
| 6,122,647 A | 9/2000 | Horowitz et al. |
| 6,144,969 A | 11/2000 | Inokuchi et al. |
| 6,151,624 A | 11/2000 | Teare et al. |
| 6,154,128 A | 11/2000 | Wookey et al. |
| 6,163,772 A | 12/2000 | Kramer et al. |
| 6,167,521 A | 12/2000 | Smith et al. |
| 6,192,367 B1 | 2/2001 | Hawley et al. |
| 6,195,661 B1 | 2/2001 | Filepp et al. |
| 6,199,204 B1 | 3/2001 | Donohue |

| | | | | | | |
|---|---|---|---|---|---|---|
| 6,209,128 B1 | 3/2001 | Gerard et al. | | 6,571,253 B1 | 5/2003 | Thompson et al. |
| 6,216,152 B1 | 4/2001 | Wong et al. | | 6,578,144 B1 | 6/2003 | Gennaro et al. |
| 6,219,698 B1 | 4/2001 | Iannucci et al. | | 6,581,061 B2 | 6/2003 | Graham |
| 6,225,996 B1 | 5/2001 | Gibb et al. | | 6,584,548 B1 | 6/2003 | Bourne et al. |
| 6,235,027 B1 | 5/2001 | Herzon | | 6,585,778 B1 | 7/2003 | Hind et al. |
| 6,253,366 B1 | 6/2001 | Mutschler, III | | 6,598,219 B1 | 7/2003 | Lau |
| 6,253,374 B1 | 6/2001 | Dresevic et al. | | 6,604,099 B1 | 8/2003 | Chung et al. |
| 6,263,313 B1 | 7/2001 | Milsted et al. | | 6,606,606 B2 | 8/2003 | Starr |
| 6,266,810 B1 | 7/2001 | Tanaka et al. | | 6,609,200 B2 | 8/2003 | Anderson et al. |
| 6,275,227 B1 | 8/2001 | DeStefano | | 6,611,822 B1 | 8/2003 | Beams et al. |
| 6,275,599 B1 | 8/2001 | Adler et al. | | 6,611,840 B1 | 8/2003 | Baer et al. |
| 6,281,896 B1 | 8/2001 | Alimpich et al. | | 6,613,098 B1 | 9/2003 | Sorge et al. |
| 6,282,711 B1 | 8/2001 | Halpern et al. | | 6,615,276 B1 | 9/2003 | Mastrianni et al. |
| 6,286,033 B1 | 9/2001 | Kishinsky et al. | | 6,629,109 B1 | 9/2003 | Koshisaka |
| 6,292,897 B1 | 9/2001 | Gennaro et al. | | 6,631,357 B1 | 10/2003 | Perkowski |
| 6,297,819 B1 | 10/2001 | Furst | | 6,631,379 B1 | 10/2003 | Cox |
| 6,308,179 B1 | 10/2001 | Petersen et al. | | 6,631,497 B1 | 10/2003 | Jamshidi et al. |
| 6,311,271 B1 | 10/2001 | Gennaro et al. | | 6,631,519 B1 | 10/2003 | Nicholson et al. |
| 6,321,334 B1 | 11/2001 | Jerger et al. | | 6,635,089 B1 | 10/2003 | Burkett et al. |
| 6,327,628 B1 | 12/2001 | Anuff et al. | | 6,636,845 B2 | 10/2003 | Chau et al. |
| 6,342,907 B1 | 1/2002 | Petty et al. | | 6,643,633 B2 | 11/2003 | Chau et al. |
| 6,343,302 B1 | 1/2002 | Graham | | 6,643,684 B1 | 11/2003 | Malkin et al. |
| 6,345,256 B1 | 2/2002 | Milsted et al. | | 6,654,737 B1 | 11/2003 | Nunez |
| 6,345,361 B1 | 2/2002 | Jerger et al. | | 6,658,417 B1 | 12/2003 | Stakutis et al. |
| 6,347,323 B1 | 2/2002 | Garber et al. | | 6,668,369 B1 * | 12/2003 | Krebs et al. ............... 717/125 |
| 6,349,408 B1 | 2/2002 | Smith | | 6,678,717 B1 | 1/2004 | Schneider |
| 6,353,926 B1 | 3/2002 | Parthesarathy et al. | | 6,691,230 B1 | 2/2004 | Bardon |
| 6,356,906 B1 | 3/2002 | Lippert et al. | | 6,691,281 B1 | 2/2004 | Sorge et al. |
| 6,357,038 B1 | 3/2002 | Scouten | | 6,697,944 B1 | 2/2004 | Jones et al. |
| 6,366,907 B1 | 4/2002 | Fanning et al. | | 6,701,434 B1 | 3/2004 | Rohatgi |
| 6,366,912 B1 | 4/2002 | Wallent et al. | | 6,711,679 B1 | 3/2004 | Guski et al. |
| 6,369,840 B1 | 4/2002 | Barnett et al. | | 6,735,721 B1 | 5/2004 | Morrow et al. |
| 6,369,841 B1 | 4/2002 | Salomon et al. | | 6,748,385 B1 | 6/2004 | Rodkin et al. |
| 6,374,402 B1 | 4/2002 | Schmeidler et al. | | 6,751,777 B2 | 6/2004 | Bates et al. |
| 6,381,742 B2 | 4/2002 | Forbes et al. | | 6,760,723 B2 | 7/2004 | Oshinsky et al. |
| 6,381,743 B1 | 4/2002 | Mutschler, III | | 6,772,139 B1 | 8/2004 | Smith, III |
| 6,389,434 B1 | 5/2002 | Rivette et al. | | 6,772,165 B2 | 8/2004 | O'Carroll |
| 6,393,456 B1 | 5/2002 | Ambler et al. | | 6,774,926 B1 | 8/2004 | Ellis et al. |
| 6,396,488 B1 | 5/2002 | Simmons et al. | | 6,779,154 B1 | 8/2004 | Nussbaum et al. |
| 6,408,311 B1 | 6/2002 | Baisley et al. | | 6,816,849 B1 | 11/2004 | Halt, Jr. |
| 6,421,070 B1 | 7/2002 | Ramos et al. | | 6,845,380 B2 | 1/2005 | Su et al. |
| 6,421,656 B1 | 7/2002 | Cheng et al. | | 6,845,499 B2 | 1/2005 | Srivastava et al. |
| 6,425,125 B1 | 7/2002 | Fries et al. | | 6,848,078 B1 | 1/2005 | Birsan et al. |
| 6,434,563 B1 | 8/2002 | Pasquali et al. | | 6,871,220 B1 | 3/2005 | Rajan et al. |
| 6,434,564 B2 | 8/2002 | Ebert | | 6,874,130 B1 | 3/2005 | Baweja et al. |
| 6,442,755 B1 * | 8/2002 | Lemmons et al. ............. 725/47 | | 6,876,996 B2 | 4/2005 | Czajkowski et al. |
| 6,446,110 B1 | 9/2002 | Lection et al. | | 6,901,403 B1 | 5/2005 | Bata et al. |
| 6,449,617 B1 | 9/2002 | Quinn et al. | | 6,931,532 B1 | 8/2005 | Davis et al. |
| 6,460,058 B2 | 10/2002 | Koppolu et al. | | 6,948,133 B2 | 9/2005 | Haley |
| 6,470,349 B1 | 10/2002 | Heninger et al. | | 6,963,875 B2 | 11/2005 | Moore et al. |
| 6,473,800 B1 | 10/2002 | Jerger et al. | | 6,968,505 B2 | 11/2005 | Stoll et al. |
| 6,476,828 B1 | 11/2002 | Burkett et al. | | 6,996,781 B1 | 2/2006 | Myers et al. |
| 6,476,833 B1 | 11/2002 | Moshfeghi | | 7,003,722 B2 | 2/2006 | Rothchiller et al. |
| 6,477,544 B1 | 11/2002 | Bolosky et al. | | 2001/0022592 A1 | 9/2001 | Alimpich et al. |
| 6,480,860 B1 | 11/2002 | Monday | | 2001/0024195 A1 | 9/2001 | Hayakawa |
| 6,487,566 B1 | 11/2002 | Sundaresan | | 2001/0037345 A1 | 11/2001 | Kiernan |
| 6,493,702 B1 | 12/2002 | Adar et al. | | 2001/0056429 A1 * | 12/2001 | Moore et al. ............... 707/101 |
| 6,502,101 B1 | 12/2002 | Verprauskus et al. | | 2001/0056460 A1 | 12/2001 | Sahota et al. |
| 6,502,103 B1 | 12/2002 | Frey et al. | | 2002/0026441 A1 | 2/2002 | Kutay et al. |
| 6,505,230 B1 | 1/2003 | Mohan et al. | | 2002/0026461 A1 * | 2/2002 | Kutay et al. ............... 707/523 |
| 6,505,300 B2 | 1/2003 | Chan et al. | | 2002/0032758 A1 | 3/2002 | Voskuil |
| 6,507,856 B1 | 1/2003 | Chen et al. | | 2002/0040469 A1 | 4/2002 | Pramberger |
| 6,516,322 B1 | 2/2003 | Meredith | | 2002/0057297 A1 * | 5/2002 | Grimes et al. ............... 345/810 |
| 6,519,617 B1 | 2/2003 | Wanderski et al. | | 2002/0100027 A1 | 7/2002 | Binding et al. |
| RE38,070 E | 4/2003 | Spies et al. | | 2002/0112224 A1 | 8/2002 | Cox |
| 6,546,546 B1 | 4/2003 | Van Doorn | | 2002/0133484 A1 | 9/2002 | Chau et al. |
| 6,549,221 B1 | 4/2003 | Brown et al. | | 2002/0152244 A1 | 10/2002 | Dean et al. |
| 6,549,878 B1 | 4/2003 | Lowry et al. | | 2002/0156772 A1 | 10/2002 | Chau et al. |
| 6,549,922 B1 | 4/2003 | Srivastava et al. | | 2002/0156929 A1 | 10/2002 | Hekmatpour |
| 6,553,402 B1 | 4/2003 | Makarios et al. | | 2002/0169789 A1 | 11/2002 | Kutay et al. |
| 6,560,620 B1 | 5/2003 | Ching | | 2002/0174147 A1 * | 11/2002 | Wang et al. ............... 707/513 |
| 6,560,640 B2 | 5/2003 | Smethers | | 2002/0184219 A1 | 12/2002 | Preisig et al. |
| 6,563,514 B1 | 5/2003 | Samar | | 2002/0188613 A1 | 12/2002 | Chakraborty et al. |

| | | |
|---|---|---|
| 2002/0196288 A1 | 12/2002 | Emrani |
| 2002/0198891 A1 | 12/2002 | Li et al. |
| 2002/0198935 A1 | 12/2002 | Crandall, Sr. et al. |
| 2003/0007000 A1 | 1/2003 | Carlson et al. |
| 2003/0014397 A1 | 1/2003 | Chau et al. |
| 2003/0025732 A1 | 2/2003 | Prichard |
| 2003/0037303 A1 | 2/2003 | Bodlaender et al. |
| 2003/0043986 A1 | 3/2003 | Creamer |
| 2003/0046665 A1 | 3/2003 | Jlin |
| 2003/0051243 A1* | 3/2003 | Lemmons et al. ............ 725/44 |
| 2003/0056198 A1 | 3/2003 | Al-Azzawe |
| 2003/0061386 A1 | 3/2003 | Brown |
| 2003/0120659 A1* | 6/2003 | Sridhar ...................... 707/100 |
| 2003/0120671 A1 | 6/2003 | Kim et al. |
| 2003/0120686 A1 | 6/2003 | Kim et al. |
| 2003/0140132 A1 | 7/2003 | Champagne et al. |
| 2003/0158897 A1* | 8/2003 | Ben-Natan et al. ......... 709/204 |
| 2003/0167277 A1 | 9/2003 | Hejisberg at al |
| 2003/0182268 A1 | 9/2003 | Lal |
| 2003/0187930 A1 | 10/2003 | Ghaffar et al. |
| 2003/0189593 A1 | 10/2003 | Yarvin |
| 2003/0204511 A1 | 10/2003 | Brundage |
| 2003/0204814 A1* | 10/2003 | Elo et al. .................... 715/513 |
| 2003/0205615 A1 | 11/2003 | Marappan |
| 2003/0225768 A1 | 12/2003 | Chaudhuri |
| 2003/0225829 A1 | 12/2003 | Pena et al. |
| 2003/0226111 A1 | 12/2003 | Wirts et al. |
| 2003/0226132 A1 | 12/2003 | Tondreau et al. |
| 2003/0237046 A1 | 12/2003 | Parker et al. |
| 2003/0237047 A1 | 12/2003 | Borson |
| 2004/0002939 A1 | 1/2004 | Arora |
| 2004/0073565 A1 | 4/2004 | Kaufman et al. |
| 2004/0117769 A1 | 6/2004 | Lauzon et al. |
| 2004/0146199 A1 | 7/2004 | Berkner et al. |
| 2004/0186762 A1 | 9/2004 | Beaven et al. |
| 2004/0205473 A1* | 10/2004 | Fisher et al. ................ 715/500 |
| 2004/0205571 A1 | 10/2004 | Adler et al. |
| 2004/0205605 A1 | 10/2004 | Adler et al. |
| 2004/0221245 A1 | 11/2004 | Chickles et al. |
| 2005/0027757 A1 | 2/2005 | Kiessig et al. |
| 2005/0102370 A1 | 5/2005 | Lin et al. |
| 2005/0171746 A1 | 8/2005 | Thalhammer-Reyero |
| 2005/0198086 A1 | 9/2005 | Moore et al. |
| 2005/0223320 A1 | 10/2005 | Brintzenhofe et al. |
| 2005/0240876 A1 | 10/2005 | Myers et al. |
| 2006/0020586 A1 | 1/2006 | Prompt et al. |
| 2006/0031757 A9 | 2/2006 | Vincent, III |
| 2006/0036995 A1 | 2/2006 | Chickles et al. |
| 2006/0041838 A1 | 2/2006 | Khan |
| 2006/0085409 A1 | 4/2006 | Rys et al. |

FOREIGN PATENT DOCUMENTS

| | | |
|---|---|---|
| EP | 0961197 | 12/1998 |
| EP | 0 961 197 | 1/1999 |
| EP | 1 076 290 A2 | 2/2001 |
| JP | 3191429 | 1/1900 |
| JP | 63085960 | 4/1988 |
| JP | 401173140 A | 7/1989 |
| JP | 4225466 | 8/1992 |
| JP | 5314152 | 11/1993 |
| JP | 406014105 | 1/1994 |
| JP | 6139241 | 5/1994 |
| JP | 6180697 | 6/1994 |
| JP | 6180698 | 6/1994 |
| JP | 2000132436 | 5/2000 |
| JP | 2002183652 | 6/2002 |
| JP | 2003173288 | 6/2003 |
| WO | WO 99/24945 | 5/1999 |
| WO | WO 99/56207 | 11/1999 |
| WO | WO 01/44934 A1 | 6/2001 |

OTHER PUBLICATIONS

W3C Editor James Clark and Steve Derose, XML Path Language (XPath) Version 1.0 Publication date Nov. 16, 1999 By W3C (MIT, INRIA, Keio).*
U.S. Appl. No. 60/209,713.*
U.S. Appl. No. 60/203,081.*
U.S. Appl. No. 60/191,662.*
W. Brogden, "Arbortext Adept 8 Editor Review," O'Reilly XML.COM, 'Online! Sep. 22, 1999) XP002230080, retrieved from the Internet <URL:http://www.xml.com/pub/a/1999/09/adept/AdeptRvw.htm>, retrieved on Feb. 5, 2003.
L. Alschuler, "A tour of XMetal". O'Reilly XML.COM, 'Online! Jul. 14, 1999, XP002230081, retrieved from the Internet: <URL:http://www.xml.com/pub/a/SeyboldReport/ip031102.html>, retrieved on Feb. 5, 2003.
A. Davidow, "XML Editors: Allegations of Functionality in search of reality," INTERNET, 'Online! 1999, XP002230082, retrieved from the Internet, <URL:http://www/.ivritype.com/xml/>.
Noore A.; "A secure conditional access system using digital signature and encryption" 2003 Digest of Technical Papers. International Conference on Consumer Electronics Jun. 2003 pp. 220-221.
Komatsu N. et al.; "A proposal on digital watermark in document image communication and its application to realizing a signature" Electronics and Communications in Japan.
Sun Q. et al.; "A robust and secure media signature scheme for JPEG images" Proceedings of 2002 IEEE Workshop on Multimedia Signal Processing Dec. 2002 pp. 296-299.
Whitehill; "Whitehill Composer" Whitehill Technologies Inc. 2 pages.
Pacheco et al.; "Delphi 5 Developer's Guide" Sams Publishing 1999 Chapter 31 Section: Data Streaming 6 pages.
Clarke; "From small beginnings"; Knowledge Management, Nov. 2001; www.bl.uk; 2 pages.
McCright, J.S., "New Tool Kit to Link Groove with Microsoft SharePoint", eWeek, Enterprise News & Reviews, Ziff Davis Media Inc., Jul. 29, 2002, 1 page.
Musgrave, S., "Networking technology—impact and opportunities", Survey and Statistical Computing 1996. Proceedings of the Second ASC International Conference. Sep. 1996. pp. 369-378. London, UK.
Rapaport, L., "Get more from SharePoint", Transform Magazine, vol. 11, No. 3, Mar. 2002, pp. 13, 15.
Hwang, Kai et al., "Micro-Firewalls for Dynamic Network Security with Distributed Intrusion Detection," IEEE Int'l. Symposium on Network Computing and Applications, 2001 pp. 68-79.
Schmid, M. et al., "Protecting Data from Malicious Software," 18th Annual Security Applications Conference, 2002, pp. 199-208.
Kaiya, Haruhiko et al., "Specifying Runtime Environments and Functionalities of Downloadable Components under the Sandbox Model," Int'l. Symposium on Principles of Software Evolution, 2000, pp. 138-142.
Tomimori, Hiroyuki et al., "An Efficient and Flexible Access control Framework for Jav aPrograms in Mobile Terminals," Proceedings of 22nd Int'l. Conference on Distributed Computing Systems Workshops, 2002, pp. 777-782.
Prevelakis, Vassilis et al., "Sandboxing Applications," FREENIX Track: 2001 USENIX Annual Technical Conference, pp. 119-126.
"Store and Organize Related Project Files in a Binder," Getting Results with Microsoft Office, 1990, pp. 109-112.
Barker et al., "Creating In-Line Objects Within An Itegrated Editing Environment," IBM Technical Disclosure Bulletin Vol. 27, No. 5, Oct. 1984, p. 2962.
Berg A., "Naming and Binding: Monikers," Inside Ole, 1995, Chapter 9, pp. 431-490.
Clapp D., "The NeXT Application Kit Part I: Non-Responsive Classes," The NeXT Bible, 1990, Chapter 16, pp. 275-293.
DiLascia et al., "Sweeper," Microsoft Interactive Developer Vol. 1, No. 1, 1996, 27 pages.

Herzner et al., "CDAM- Compound Document Access and Management. An Object-Oriented Approach," Multimedia Systems Interaction and Applications, 1992, Chapter 3, pp. 17-36.

Kobayashi et al., "An Update on BTRON-specification OS Development," IEEE 1991, pp. 132-140.

Peterson B., "Unix Variants," Unix Review vol. 10, No. 4, Apr. 1992 pp. 29-31.

Pike et al., "Plan 9 from Bell Labs," UKUUG, Summer 1990, 10 pages.

Staneck, W., "Internal and External Media," Electronic Publishing Unleashed, 1995, Chapter 22, pp. 510-542.

Whitehill, "Whitehill Composer" Whitehill Technologies Inc., 2 pages.

Pike et al., "The Use of Name Spaces in Plan 9," Operating Systems Review, vol. 27, No. 2, Apr. 1993, pp. 72-76.

Trupin J., "The Visual Programmer," Microsoft Systems Journal, Apr. 1996, pp. 103-105.

Zdonik, S., "Object Management System Concepts," ACM 1984, pp. 13-19.

OMG XML Metadata Interchange (XMI) Specification, Version 1.2, Jan. 2002.

Laura Acklen & Read Gilgen, "Using Corel Wordperfect 9", 251-284, 424-434, 583-586 (1998).

Bruce Halberg et al, "Using Microsoft Excel 97", Published 1997, Bestseller Edition, Pertient pp. 1-9, 18-25, 85-89, 98-101, 106-113, 124-127, 144-147, 190-201, 209-210, 218-227, 581-590, 632-633, 650-655, 712-714.

Leblond et al, "PC Magazine Guide to Quattro Pro For Windows", pp. 9-11, 42-61, Ziff-Davis Press, Copyright 1993 by the Le Blond Group.

Mansfield, "Excel 97 for Busy People", Published by Osborne/Mcgraw-Hill 1997 pp. 48-50.

"Microsoft Visual Basic 5.0 Programmer's Guide 1997"; pp. 578-579; Redmond WA 98052-6399.

Atova, "User Reference manual Version 4.4, XML Spy suite 4.4," Atova Ges.m.b.H and Altova, Inc., May 24, 2002, pages cover, copyright page, 1-565.

Altova et al. XML Spy, XML integrated Development Environments, Altova Inc., 2002, pp. 1-18.

Ben-Natan, U.S. Appl. No. 60/203,081, filed May 9, 2000, entitled "Internet platform for creating and supporting communities".

Han et al., WebSplitter: A Unified XML Framework for Multi-Device Collaborative Web Browsing, 2000, ACM Conference on Cimputer Supported Cooperative Work, 10 pages.

IBM: Stack Algorithm for Extractin Subtree from Serialized Tree, Mar. 1, 1994, TDB-ACC-NONN94033, 3 pages.

Ixia Soft, "Steamlining content creation, retrieval, and publishing on the Web using TEXTML Server and SML Spy 4 Suite in an integrated, Web publishing environment," (Partner's Whitepaper, published on the Web as of Jun. 6, 2002, downlowad pp. 1-16.

U.S. Appl. No. 60/209,713 filed Jun 5, 2000, entitled, "Methods and systems for accessing, organizing presenting and viewing data", Kutay.

Microsoft Word 2000 (see Screen Shot "About Microsoft Word") Published 1983-1999 and Microsoft Excel 2000 (see Screen Shot "About Microsoft Excel") Published 1988-1999, Three pages.

U.S. Appl. No. 60/191,662 filed Mar. 23, 2000, entitled "Collection-based presistent digital archives", Moore.

Altova, Inc., "XML Spy 4.0 Manual," Altova Inc. & Altova GmbH, copyright 1998-2001, Chapters 1, 2, and 6, encompassing pp. 1-17, 18-90, and 343-362.

Cybook, INC.: "Copying the Search Form to Services-based Web Sites" INternet Article, (online) Jul. 26, 2004, "the whole document".

Excel Developer Tip (hereinafter "Excel"), "Determining the Data Type of a Cell", May 13, 1998, p. 1 (available at http://jwalk.com/ss//excel/tips/tip62.htm).

Macromedia, INC.: "Dreamweaver Technote, Changes in copying and pasting in Dreamweaver 4" Internet Article (online). "the whole document".

Rado, Dave: "How to create a template that makes it easy for users to "fill in the blanks", without doing any programming" Microsoft Word MVP FAQ Site, (online) Apr. 30, 2004, the whole document.

Steven A. Battle, et al., "Flexible Information Presentation with XML", 1998, The Institution of Electrical Engineers, 6 pages.

Paolo Ciancarini et al., "Managing Complex Documents Over the WWW: A Case Study for XML", IEEE Transactions on Knowledge and Data Engineering, vol. 11, No. 4, Jul./Aug. 1999, p. 629-638.

Hirotaka Kanemoto, et al., "An Efficiently Updatable Index Scheme for Structured Documents", 1998 IEEE, pp. 991-996.

Tommie Usdin, et al., "XML: Not a Silver Bullet, But a Great Pipe Wrench", Standardview vol. 6, No. 3, Sep. 1998, pp. 125-132.

Supoj Sutanthavibul, et al., "XFIG Version 3.2 Patchlevel 2(Jul. 2, 1998) Users Manual (Edition 1.0)", Internet Document, [Online] Jul 2, 1998, XP002229137 Retrieved from the Internet: <URL:http://www.lce.mtu.edu/online_docs/xfig332/> [retrieved on Jan. 28, 2003].

"Architecture for a Dynamic Information Area Control", IBM Technical Disclosure Bulletin, IBM Corp. New York, US, vol. 37, No. 10, Jan. 10, 1994, pp. 245-246.

Irene Au & Shuang Li, "Netscape Communicator's Collapsible Toolbars," CHI '98, Human Factors in Computing Systems, Conference Proceedings, Los Angeles, CA, Apr. 18-23, 1998, pp. 81-86.

Netscape Communication Corporation: "Netscape Communicator 4.61 for OS/2 Warp" Software, 1999, The whole software release & "Netscape—Version 4.61 [en] —010615" Netscape Screenshot, Oct. 2, 2002.

"Netscape window" Netscape Screenshot, Oct. 2, 2002.

Jan-Henrick Haukeland: "Tsbiff—tildeslash biff—version 1.2.1" Internet Document, [Online] Jun. 1999, URL:http://web.archive.org/web/19990912001527/http://www.tildeslash.com/tsbiff/.

Richard Scott Hall, "Agent-based Software Configuration and Deployment," Thesis of Univeristy of Colorado, Online, Dec. 31, 1999, retrieved from the internet on Nov. 7, 2003: <http://www.cs.colorado.edu/users/rickhall/documents/ThesisFinal.pdf>, 169 pages.

Arthur Van Hoff et al., "The Open Software Description Format," Online, Aug. 13, 1997, retrieved from the Internet on Nov. 7, 2003:<http://www.w3.org/TR/NOTE-OSD>, 11 pages.

Netscape Communications Corp., "SmartUpdate Developer's Guide," Online, Mar. 11, 1999, retrieved from the Internet on Dec. 8, 2000: <http://developer.netscape.com:80/docs/manuals/communicator/jarman/index.htm>, 83 pages.

Linnea Dayton and Jack Davis, "Photo Shop 5/5.5 WOW! Book, " 2000, Peachpit Press, pp. 8-17.

Varlamis et al., "Bridging XML-Schema and relational databases. A system for generating and manipulating relational databases using valid XML documents," DocEng '01, Nov. 9-10, 2001, Copyright 2001, ACM 1-58113-432-0/01/0011, pp. 105-114.

Hardy et al., "Mapping and Displaying Structural Transformations between XML and PDF," DocEng '02, Nov. 8-9, 2002, Copyright 2002, ACM 1-58113-594-7/02/0011, pp. 95-102.

Kim et al., "Immediate and Partial Validation Mechanism for the Conflict Resolution of Update Operations in XML Databases," WAIM 2002, LNCS 2419, 2002, pp. 387-396, Springer-Verlag Berlin Heidelberg 2002.

Chuang, T., "Generic Validation of Structural Content with Parametric Modules," ICFP '01, Sep. 3-5, 2001, Copyright 2001, ACM 1-58113-415-0/01/0009, pp. 98-109.

Chen et al., "Designing Valid XML Views," ER 2002, LNCS 2503, 2002, Springer-Verlag Berlin Heidelberg 2002, pp. 463-477.

Chen et al., "XKvalidator: A Constraint Validator for XML," CIKM '02, Nov. 4-9, 2002, Copyright 2002, ACM 1-58113-492-4/02/0011, pp. 446-452.

Rogge et al., "Validating MPEG-21 Encapsulated Functional Metadata," IEEE 2002, pp. 209-212.

Nelson, "Validation with MSXML and XML Schema," Windows Developer Magazine, Jan. 2002, pp. 35-38.

Chien et al., "XML Document Versioning," SIGMOD Record, vol. 30, No. 3, Sep. 2001, pp. 46-53.

Wong et al., "Managing and Querying Multi-Version XML Data with Update Logging," DocEng '02, Nov. 8-9, 2002, Copyright 2002, ACM 1-58113-594-7/02/0011, pp. 74-81.

Chien et al., "Efficient schemes for managing multiversionXML documents", VLDB Journal (2002), pp. 332-353.

Chien et al., "Efficient Management of Multiversion Documents by Object Referencing," Proceedings of the 27th VLDB Conference, 2001, pp. 291-300.

Chien et al., "Storing and Querying Multiversion XML Documents using Durable Node Numbers," IEEE 2002, pp. 232-241.

DYCK, T., "XML Spy Tops as XML Editor," http://www.eweek.com/article2/0,3959,724041,00.asp, Nov. 25, 2002, 4 pages.

Sara Williams and Charlie Kindel, "The Component Object Model: A Technical Overview," Oct. 1994, Microsoft Corp., pp. 1-14.

Cover, XML Forms Architecture, retrieved at <<http://xml.coverpages.org/xfa.html>> on Aug. 17, 2006, Coverpages, Jun. 16, 1999.

Raggett, "HTML Tables", retrieved on Aug. 06, 2006, at <<http:www://is-edu.hornuns.edu.vn/WebLib/books/Web/Tel/htm13-tables.html>>, W3C Internet Draft, Jul. 7, 1995, pp. 1-12.

"Webopedia Computer Dictionary" retrieved on May 9, 2006, at <<http://www.pewebopedia.com/TERM/O/OLE.html>>, Jupitermedia Corporation, 2006, pp. 07.

\* cited by examiner

AUTHORING ARBITRARY XML DOCUMENTS USING DHTML AND XSLT

RELATED APPLICATIONS

The following patent applications are related to the present application, are assigned to the assignee of this patent application, and are expressly incorporated by reference herein:

- U.S. patent application Ser. No. 09/599,298, entitled "Single Window Navigation Methods and Systems", bearing and filed on the same date as this patent application;
- U.S. patent application Ser. No. 09/599,806, entitled "Methods and Systems of Providing Information to Computer Users", bearing and filed on the same date as this patent application;
- U.S. patent application Ser. No. 09/599,299, entitled "Methods, Systems, Architectures and Data Structures For Delivering Software via a Network", bearing and filed on the same date as this patent application;
- U.S. patent application Ser. No. 09/599,048, entitled "Network-based Software Extensions", bearing and filed on the same date as this patent application;
- U.S. patent application Ser. No. 09/599,812, entitled "Architectures For And Methods Of Providing Network-based Software Extensions", bearing, and filed on the same date as this patent application.
- U.S. patent application Ser. No. 09/599,086, entitled "Task Sensitive Methods And Systems For Displaying Command Sets", bearing and filed on the same date as this patent application.

TECHNICAL FIELD

This invention relates to authoring extensible markup language (XML) documents using dynamic hypertext markup language (DHTML)

BACKGROUND

Extensible markup language (XML) is increasingly becoming the preferred format for transferring data. XML is a tag-based hierarchical language that is extremely rich in terms of the data that it can be used to represent. For example, XML can be used to represent data spanning the spectrum from semi-structured data (such as one would find in a word processing document) to generally structured data (such as that which is contained in a table). XML is well-suited for many types of communication including business-to-business and client-to-server communication.

Given the breadth of data that can be represented by XML, challenges arise when one wishes to provide a user interface to the data that a user can use to manipulate the data or the structure that contains the data. The classical approach to the user interface problem, outside of the XML environment, has been to use different UI technologies for different types of data (e.g. document, tabular data). This approach is clearly not the best when, with XML, it is more likely that a user will encounter and wish to interact with data that is both structured and unstructured. There have been some attempts at solving the problem of enabling a user to manipulate an XML document, but to date, they are extremely inflexible and do not appreciate the full power behind XML and XSL-T, the latter being a transformation that could be used to transform XML into Dynamic HTML or DHTML. For more information on XML, XSLT and XSD, the reader is referred to the following documents which are the work of, and available from the W3C (World Wide Web consortium): XML Schema Part 0: Primer, Extensible Markup Language (XML) 1.0, XML Schema Part 1: Structures, and XSL Transformations (XSLT) Version 1.0.

Consider, for example, FIG. 1 which illustrates an XML document 100, an XSLT transformation (XSL-T) 102, a resultant DHTML document 104, and an XML schema or XSD file 106. XML document 100 can be represented as a tree-like structure where each node of the tree is a corresponding XML tag. The XML document 100 must conform to an XML schema that is specified by XSD 106. XSL-T 102 is a transformation process that utilizes one or multiple templates to transform the XML document tree into a different type of tree—here a DHTML tree. The DHTML document 104 displays the data that is described in the XML tree. XSL-T is simply a collection of templates that enable the data to be presented, through DHTML in a way that can be defined by a software developer.

Consider, for example, an email message that might have several fields, i.e. "subject", "to", and the like. Each of these fields might be represented in XML as tags. For example, the "subject" field might be represented as an XML tag "subj". XSL-T creates an engine that attempts to match a current node to various templates, selects one, and may find within that template mode nodes to match. The XSL-T that transforms the XML representation of the email might include a template that matches the "subj" tag. The template would then list the string that is associated with the "subj" tag, but might place the word "Subject:" before the string in the DHTML that is ultimately displayed for the user. This is but a very simple example of the transformation process that can take place using XSL-T. XSL-T can also be used to add information to the information that is represented in an XML document. For example, various headings or other information can be added using XSL-T, with the accompanying data underneath the heading coming from the XML document. Essentially, then, XSL-T provides an extremely robust and flexible way of transforming the data that is described by the XML into a DHTML presentation. One manifestation of XSL-T is that the resultant DHTML structure may bear little resemblance to the corresponding XML tree structure that contains the data that is used by the XSLT to provide the DHTML.

The transition from XML to DHTML is then accomplished through XSL-T. This is generally a one way transition in which data that is described in XML is transformed into a presentation format for the user. Preserving the user experience of being able to interact with the data through its presentation format (e.g. DHTML) is crucial. While the transformation from XML to DHTML is fairly straightforward, there has been no clear transformation that would be the inverse of this transformation (i.e. transforming DHTML to XML) in a manner that is flexible and appreciates the full power of XSL-T. That is, while there are simple solutions to this problem, the robust nature of XSL-T and the differences in the corresponding XML and DHTML trees make it extremely difficult to attempt inverse transformation solutions.

There are solutions that enable a user to enter data in a DHTML document which is then copied back to the XML document. These solutions do not, however, enable a user to change the structure of the XML tree that represents the data. Additionally, there are solutions that are hardcoded solutions that can enable some manipulation of the XML tree given a DHTML modification, but the hardcoded nature of the solutions make them very specific to the data and XML tags with which they are used. For example, one of the XSL-T templates might include a hardcoded solution that allows a user to make structural changes to a table, such as adding a new row. This hardcoded solution is then only usable in connection with the table for which it was specifically defined. If a developer wishes to use the hardcoded solution for a different table, they must physically alter the programmatic solution to specifically apply to their situation. There are solutions which enable authorship of arbitrary XML through user-friendly views, but not through DHTML and XSL-T. Exemplary products include Arbortext's Adept Editor, SoftQuad's XMetal, INRIA's Thot, and FrameMaker's Framemaker for SGML.

Accordingly, this invention arose out of concerns associated with providing user interfaces that enable a user to manipulate a DHTML document with the manipulations being transferred back to the XML tree that represents the data of the DHTML presentation in a flexible, repeatable manner.

SUMMARY

Methods and systems of authoring XML using DHTML views are described. Various user interfaces can be automatically or semi-automatically provided in a DHTML view that enable a user to interact with a DHTML view and change values (e.g. text or properties) of an associated DHTML tree. Value changes are translated to modifications of an associated XML structure. A transformation, e.g. an XSL-T, is applied to the modified XML structure which then changes the DHTML view to reflect the user's interaction. The interfaces, some of which are termed "in document" interfaces, permit a user to interact with a DHTML view and have value modifications automatically made to a corresponding XML document that describes data that is associated with the DHTML view. Presentation of the various "in document" interfaces takes place by considering not only an XML schema (of which the XML document is an instance), but an XSL-T (XSLT transformation) that was utilized to transform the XML document into the DHTML view.

In addition, the notion of a crystal is introduced and is used to map changes in a DHTML view directly back to a corresponding XML document. A crystal, in a basic form, includes one or more behaviors and associated XSL-T. In the illustrated example, a behavior is implemented as binary code that is associated with or attached to DHTML tags that are generated by the XSL-T. The crystals are used to transform XML into the DHTML views. The behaviors of a crystal are defined to be data-shape specific or dependent, with the data shape being defined by the XML document. The behavior is not necessarily dependent upon any schema, data or tags. Because of its data-shape dependent nature, crystals can be packaged for reuse with various XML documents which have no relation to one another other than a shape that is defined by the XML.

Behaviors can be attached to DHTML tags that are generated by the XSL-T. The behaviors ensure that user interactions with the DHTML view are mapped directly back to the XML document. In this way, the XML document can be authored to reflect the changes that are made to the DHTML view by the user.

DETAILED DESCRIPTION

Overview

Figure 1:
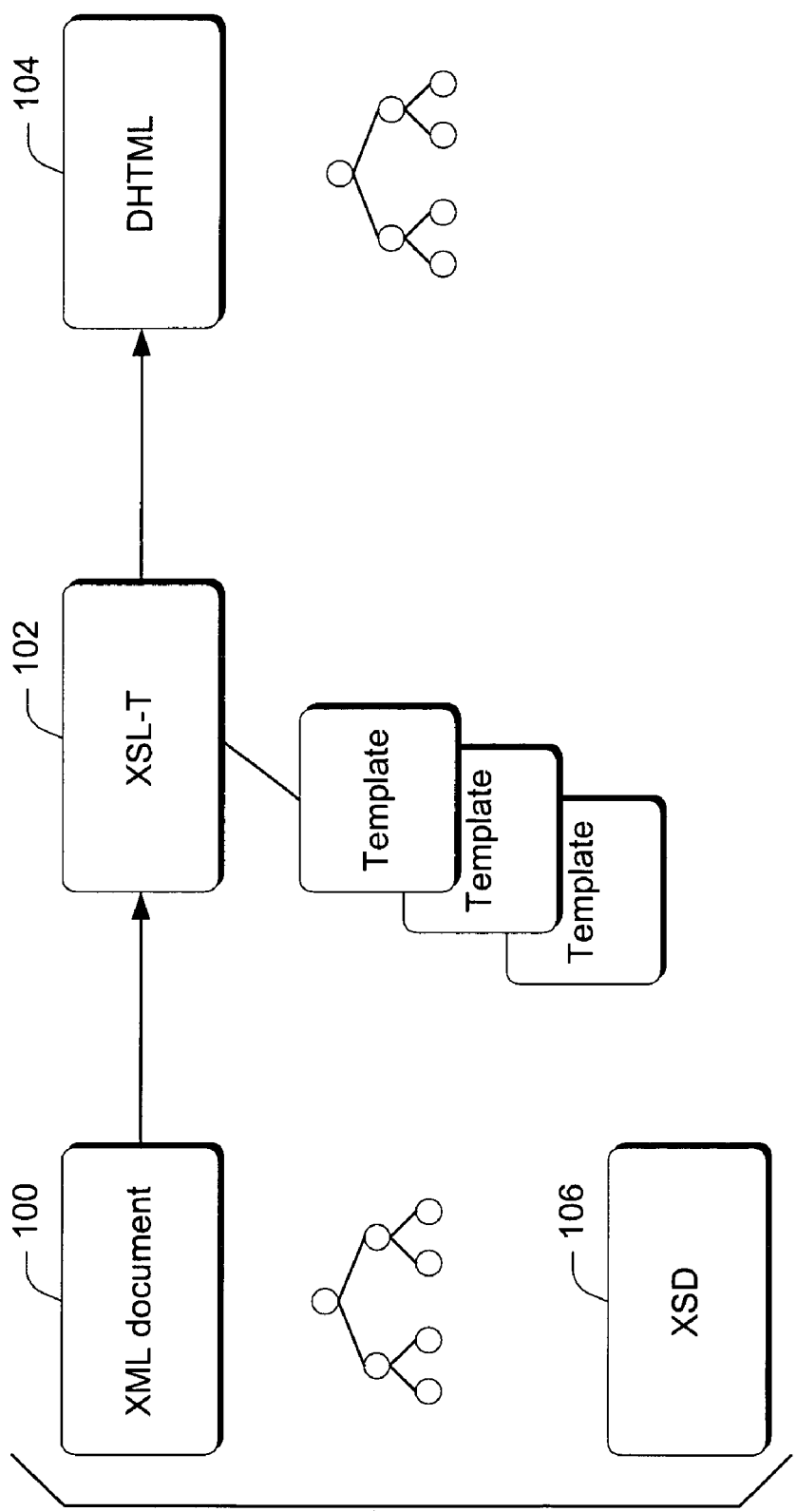
FIG. 1 is a high level block diagram that illustrates an XML document, an XSLT transformation, a DHTML view and a XSD or schema.

Methods and systems of authoring XML using DHTML views are described. In one implementation, various user interfaces can be automatically or semi-automatically provided in a DHTML view that then enable a user to interact with a DHTML view and change values (e.g. text or properties) of an associated DHTML tree. Value changes are translated to modifications of an associated XML structure. A transformation, e.g. an XSL-T, is applied to the modified XML structure which then changes the DHTML view to reflect the user's interaction. The interfaces, some of which are termed "in document" interfaces, permit a user to interact with a DHTML view and have those interactions reflected in a corresponding XML document that describes data that is associated with the DHTML view. These modifications can be made regardless of the complexity of the XSL-T that was utilized to transform the XML into the DHTML. Presentation of the various in document interfaces takes place by considering not only an XML schema (of which the XML document is an instance), but an XSL-T (XSLT transformation) that was utilized to transform the XML document into the DHTML view.

In another implementation, the notion of a crystal is introduced. A crystal, in a basic form, includes one or more behaviors and associated XSL-T. The crystals are used to transform XML into the DHTML views. The behaviors of a crystal are defined to be data-shape specific or dependent, with the data shape being defined by the XML document. The behavior is not necessarily dependent upon any schema, data or tags. Because of its data-shape dependent nature, crystals can be packaged for reuse with various XML documents which have no relation to one another other than a shape that is defined by the XML. In the described implementation, behaviors are attached to the DHTML tags that are generated by the XSL-T. The behaviors ensure that user interactions with the DHTML view are mapped directly back to the XML document. In this way, the XML document can be authored to reflect the changes that are made to the DHTML view by the user. Because crystals are data shape-dependent and not schema dependent, as the shape is defined by the XML document, they can be used for authoring fragments of XML belonging to different schemas; those fragments simply share the same shape.

In this document, the following terminology will be used:
Schema—a file (e.g. an XSD file) describing the schema for a particular type of XML document; schemas typically contain predefined tags and attributes that define the shape of the XML trees that represent an XML document; the schema provides a structure that each XML document must comply with; while editing an XML document, the schema is accessible through an instantiated DOM (document object model) (XDR DOM). Alternately, relevant information can be obtained from the schema and cached for use.

XML document—an instance of an XML schema. Theoretically, for one schema there could be an infinite number of documents that instantiate the schema. When editing a document, the initial version and the final version of the document both adhere to the same schema, though the documents themselves are different. While processing, the XML document is instantiated through an instantiated DOM (XML DOM).

XSLT transformation—an XML file that transforms the XML document into an HTML view; for each XML document there could be any number of XSLT transformations, each creating a different HTML view over the same document. An XSL-T file consists of one or more templates that match elements in the XML document. The XSL-T file that is initially authored by the application author is transformed by NetDocs when applied in edit mode into a NetDocs editing aware XSL-T. This transformation may break out templates into multiple templates, and add the appropriate behaviors (see below) based on NetDocs-specific hints added by the application developer. While editing the XML document, the transformed XSL-T is accessible to NetDocs through an instantiated DOM (XSL-T DOM).

DHTML view—this is the result of the XSLT transformation applied on the XML document. The DHTML tree contains visual cues for displaying the data, but also behaviors. These behaviors are introduced by the XSLT transformation. While there could be behaviors introduced by the author of the XSLT transformation, there are behaviors introduced by NetDocs when it applies the transformation. These latter behaviors hold the logic for:

Copying to the XML DOM the values of the HTML leaf nodes that are modified

Determining, based on the cursor location in the HTML document, what editing services are available in the editing context. The editing context is determined by the HTML context in conjunction with the XSD context and the XSL-T template that was applied to generate that part of the view. The service is made known to the In-place (in the editing area) for pre-defined UI structures (e.g. table, grid, calendar control, label)

Enabling the appropriate XML editing context blocks in the NetDocs ContextBlock area.

Modifying the structure of the XML DOM based on the editing service selected

Incrementally updating the HTML view, by refreshing just the part of the view that is affected by the changes to the XML DOM.

Exemplary Computing Environment

The embodiment described just below can be employed in connection with various computer systems. A computer system, for purposes of this document, can be considered as any computing device that includes some type of processor, i.e. a microprocessor, and some type of operating system. Thus, a computer system can be construed to include, without limitation, traditional desktop computers, more powerful servers, various hand-held devices such as cell phones, pocket-held computer devices and the like.

Figure 2:
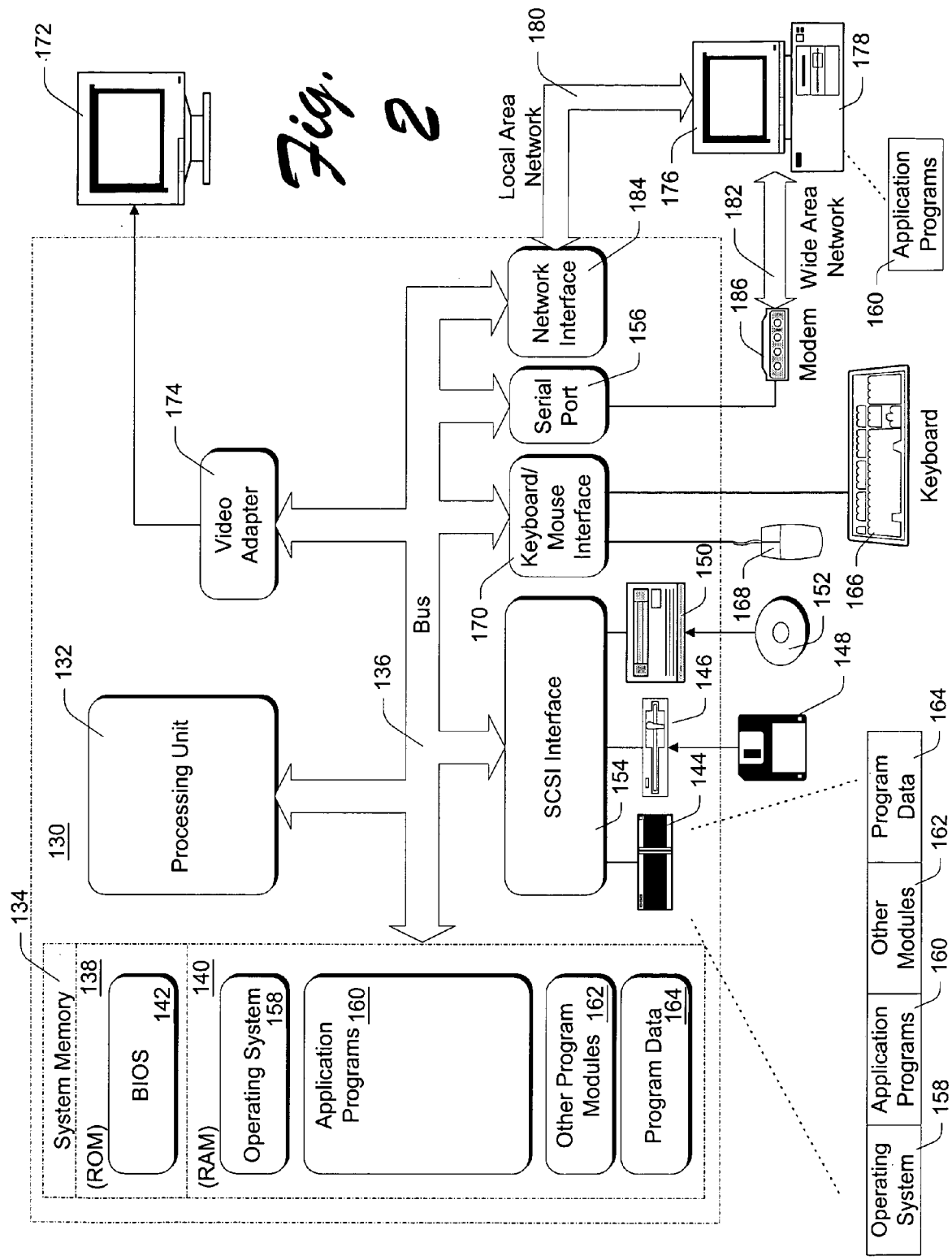
FIG. 2 is a high level diagram of a computer system that can be utilized to implement the described embodiments.

FIG. 2 shows an exemplary computer system that can be used to implement the embodiments described herein. Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 2. The logical connections depicted in FIG. 2 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Exemplary Implementation

The inventive methods and systems discussed below are configured for use in connection with an implementation, aspects of which are described in the documents incorporated by reference above. That implementation essentially provides a single application program having a single navigable window that can be navigated to multiple different functionalities that are provided by the application program. The functionalities are extensible and can be extended via a network such as the Internet.

Use of Schema and XSL-T to Generate a User Interface

When a user interacts with a DHTML document for the purpose of changing, in some way, the document through either manipulation of one or more of its values or properties, it is important that those manipulations be made, in a consistent manner, to the XML document that describes the structure of the data behind the DHTML document. In order to manipulate the XML document that describes the structure of the data behind the DHTML, there needs to be a way to transform user interactions in the DHTML to changes in the XML document. This is the problem of finding an inverse of the transformation function that is provided by the XSL-T.

In one implementation, the described embodiment addresses this problem by automatically (or semi-automatically, with some hint given by the application developer) generating an appropriate user interface (UI) within the DHTML document that allows the user to manipulate or interact with the DHTML document. The presentation of the UI takes into account not only the XML schema, but also the XSL-T transformations that were utilized to provide the DHTML. This represents a significant departure from other XML authoring solutions that look only to the XML schema to determine what can and cannot be added to an XML document. The UIs thus allow user interaction with the DHTML view (e.g. adding and/or deleting structure) to be directly transferred back to the XML document.

There are many various potential types of UIs that can be presented to a user to enable them to interact with a document. Some examples include, without limitation, context blocks which are automatically added to a window based upon the user's context. Context blocks are discussed in more detail in the Application entitled "Task Sensitive Methods And Systems For Displaying Command Sets", incorporated by reference above. Other forms of UIs can include so-called widgets which are decorations within a document itself that allow a user to interact with the document. For example, if a document contains a table, there can be additional adornments around the table on which a user can click to add or delete a row or column, or to move items around within the column. Another type of UI is an accelerator which allows interaction through the keyboard. For example, if you press "Control-L" some type of predefined action is implemented.

In this described embodiment, a decision process is undertaken that decides which UIs to present to a user and when to present them. That is, there are potentially a number of different UI choices that can be made depending on what a user is doing in a particular document and where they are in the document. An inventive approach is to utilize a number of different parameters and based upon analysis of the parameters make a decision on which UI to present to a user so that they can interact with the DHTML view. In the described embodiment, the following parameters can be used:

Selection of where a user is in a particular DHTML document. This translates to where a user is in a particular XML document because the selection initially starts on the DHTML side and has a correspondence on the XML side;

The portion of the XML schema that corresponds to the user's selection;

The UI types that would be desirable to generate; and

The XSL-T file

In the XSL-T file, there are certain constructs that can be suggestive of certain structures in the resultant DHTML. For example, the XSL-T file may include a "xsl:for-each" construct (i.e. for each customer, take a certain action). This construct is suggestive of a repetitive structure in the DHTML, such as a table or a paragraph. That is, if there are a number of customers, then repeating a certain action would repetitively define a certain type of structure. By considering these XSL-T constructs, certain UI types can be identified that can be displayed for the user.

An example is table editing. For example, if expenses are optional, according to the schema, initially there may be no expenses in a table. The XSL-T would have a "for-each" construct to render each expense, but since there are none in the XML doc, nothing is displayed. The UI should in this case produce a context block for adding an expense.

Once the first expense is created, by re-applying the XSLT transformation, a table is now viewable. At this point, based on the XSL-T hint that there is a "for-each" associated with an expense, and the schema information that multiple expenses can be added, a decision is made to not show the "Add expense" as a context block, but to add an appropriate in-doc UI that would now take over the functionality of adding additional expenses as new rows to the table.

When addressing the problem of which UI to display for the user to enable interaction with a document, it is desirable to keep the overall appearance that is presented to the user as uncluttered as possible. For example, many different context blocks could be presented to user, each with its own engagable buttons that can be engaged by a user for interacting with the DHTML view. This is not desirable though because it can potentially clutter the context block area. It would be more ideal to have "in document" UIs (e.g. widget UIs) within a document that are specific to the document itself and which allow a user to interact with the document. An "in document" UI is a UI that appears within a portion of the document and enables user interaction with a portion of the document. Consider, for example, a Word document that contains an embedded drawing. When the user clicks on the embedded drawing, the drawing can appear within a frame that contains one or more buttons that can be clicked on to manipulate the drawing, e.g. a rotate button to rotate the drawing. The buttons that are associated with the embedded drawing are considered as "in document" UIs.

In order to provide these types of UIs, the described embodiment examines the XSL-T file to identify which UI candidates are more suited to have their functionalities provided by "in document" UIs.

For example, if the schema specifies that multiple expenses are allowed, and the XSL-T has a "for-each" construct for expenses, by looking at the first element introduced by the XSL-T after an expense is matched, it could determine what kind of helpful UI to add. If an DHTML TABLE is created, then it should be adorned with table-editing widgets, but if there is SPAN, for example, then create a context block, and not an in-doc UI.

That is, the above-described context blocks are not "in document" because they are provided within a pane that is disposed adjacent a document area within which a user can work on a document. One goal of the described embodiment is to identify UIs, based upon the analysis discussed below, that are the best candidates for incorporation as "in document" UIs that specifically adorn document portions and permit user interaction with the document itself.

Consider that, without taking into account the XSL-T in the analysis of which UIs to present to a user, the only UIs that could be presented would not be in-document UIs. The context blocks are the most generic UI constructs in the present example. But if we know that we have a table created in DHTML, then the context blocks can be replaced by in-doc constructs. By inspecting the XSL-T we can find out what DHTML construct is created by the XSLT transformation. That is, without consideration of the XSL-T, only generic UIs, e.g. the context block UIs, would likely be generated. For example, if a user is working within a DHTML document that contains a table, a context block can be provided that enables the user, through manipulation of various "out of document" UIs to manipulate the table, e.g. adding a row, column and the like. By considering the XSL-T, the UI that is produced can be refined and the context blocks, or at least a portion of the functionality that is provided by the context blocks, can be replaced with other types of in document UIs. The XSL-T is thus used for refinement of the UIs.

Figure 3:
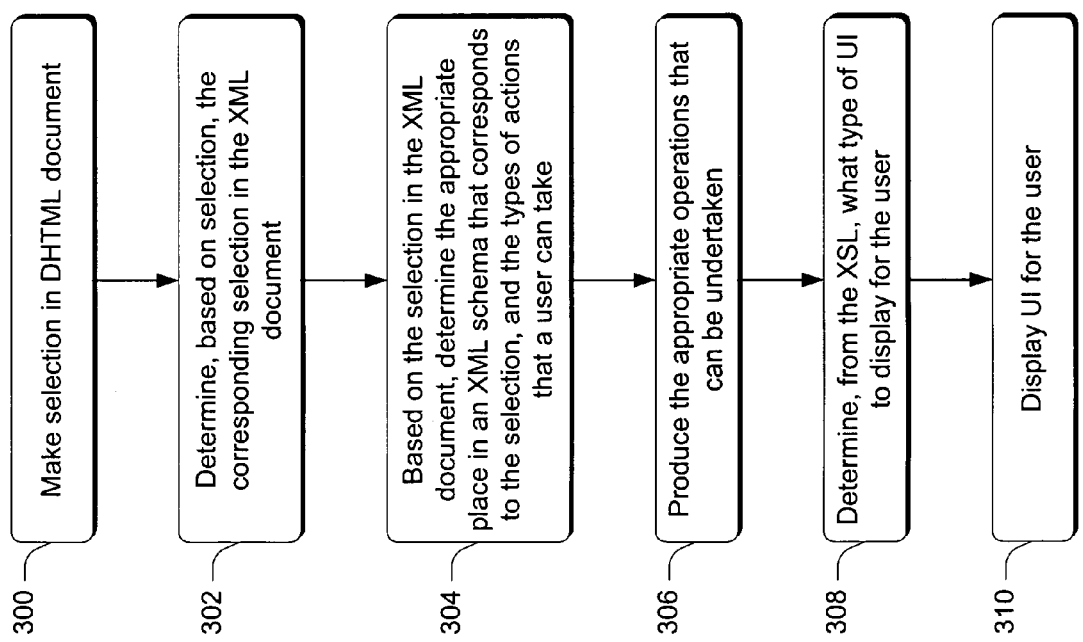
FIG. 3 is a flow diagram that describes steps in a method in accordance with one described embodiment.

FIG. 3 shows a flow diagram that describes steps in a UI generation method in accordance with this described embodiment. Step 300 makes a selection in a DHTML document. This step is implemented by a user moving their cursor to a particular area within a document. Step 302 determines, based upon the user's selection, the corresponding selection in the XML document. For example, if a user has selected a particular portion of a table used to display a specific fragment of the XML document, then this step determines the exact fragment of the XML document that corresponds to the user's selection. Based on the selection in the XML document, step 304 determines the appropriate place in the XML schema that corresponds to the selection and the various types of actions that can be taken from this selection. The various types of actions correspond to the various ways in which a user might manipulate the portion of the document that they have selected. Step 306 then produces the appropriate operations that can be undertaken for the various action types. For example, if the user is working in a table, this step might produce operations for adding a row or column or deleting a row or column. Once the operations are produced by step 306, step 308 determines, from the XSL-T file, what type of UI to display for the user. If the XSL-T is not considered in this process, then the available UIs would be presented as context blocks (i.e. not "in document" UIs). By using the XSL-T, the described embodiment refines the production of context blocks by reducing the number of context blocks that are produced and, instead, producing "in document" UIs that now relocate the functionality that would otherwise be provided by the context blocks.

Manipulation of XML Structures Using Crystals

Recall that one of the benefits of XML is the richness with which data can be described. XML, by its very nature, can provide a wide variety of variations of data. Because of this, UI solutions for interacting with data (displayed in DHTML using XSL-T) have been hardcoded and specific to individual schemas. This is a manifestation of the ease with which hardcoded solutions can be provided through XSL-T.

In one described embodiment, the notion of a crystal is introduced to enable interactions with a DHTML view to be directly mapped back to the XML file or tree. Advantageously, the crystals are configured to work on various data shapes, independent of the XML schemas. This means that when the data has a particular shape, as defined by the XML tree that contains the data, specific crystals that are configured for that particular shape can be used to render the DHTML and also ensure that user interactions with the DHTML view are directly mapped back to the XML tree. The crystals do not care about the specific data that is provided by the data shape, nor the schema or tags that are used to contain the data.

Figure 4:
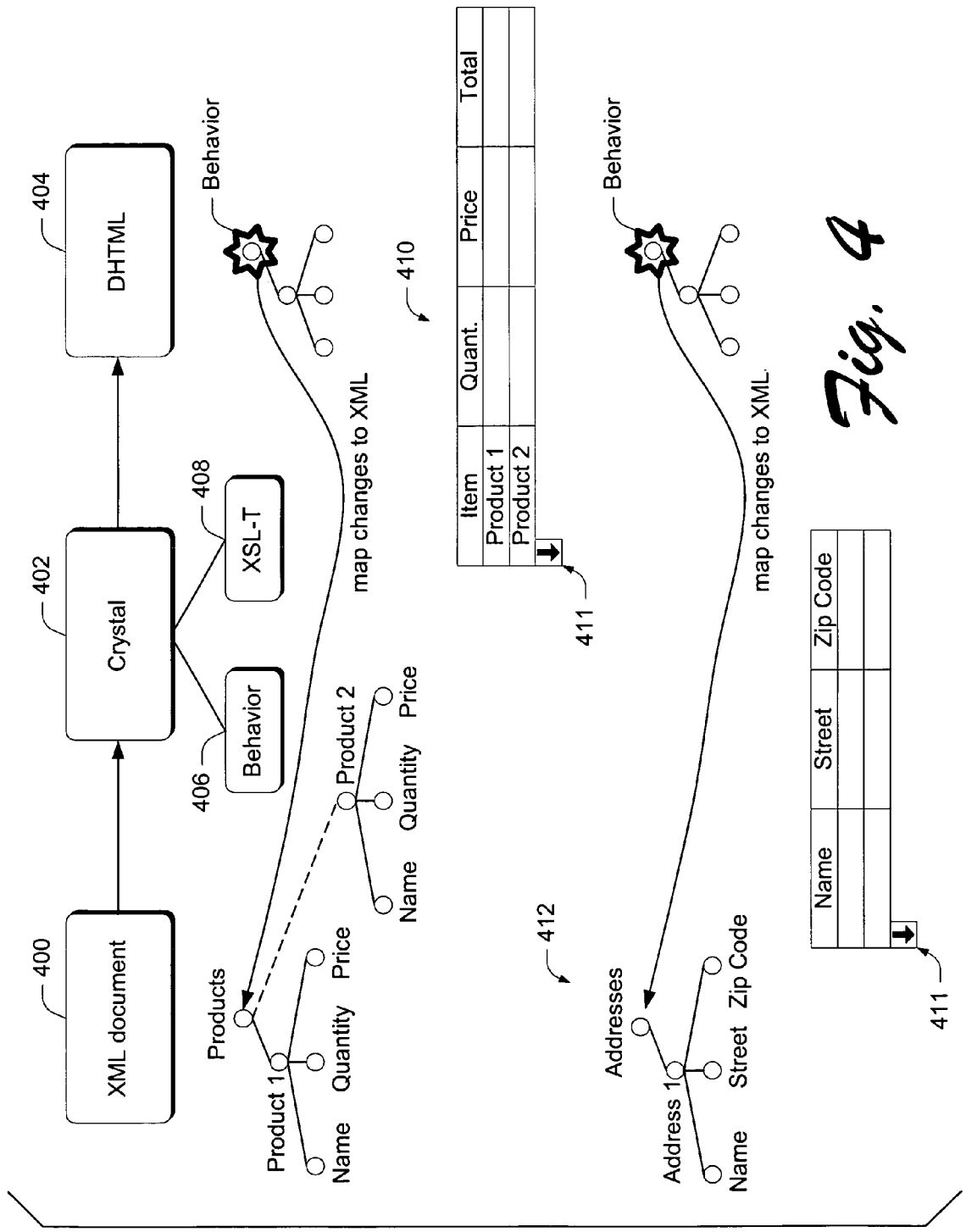
FIG. 4 is a block diagram that illustrates one aspect of how changes to a DHTML view get mapped back to a corresponding XML document.

Consider, for example, FIG. 4 which shows an XML document 400, a crystal 402 and the resultant DHTML document 404. In one basic form, a crystal comprises one or more behaviors 406 and the basic XSL-T 408 that is utilized to transform the XML into the DHTML. The behaviors are implemented, in this particular example, as binary code that is associated with or attached to the DHTML tags that are generated by the XSL-T. Consider, for example, the hierarchical tree that is shown directly below XML document 400. This hierarchical tree represents a portion of an XML tree that is maintained in memory. In this example, the tree has a "products" root node and a "product 1" node that is a child of the "products" root node. Underneath the "product 1" node are three children nodes labeled "name", "quantity", and "price". This XML tree may thus represent a portion of a purchase order that is utilized to purchase various products. When rendered by the crystal 402, the resulting DHTML view is shown at 410. This DHTML view is diagrammed directly above view 410 as a tree with a behavior associated with a DHTML tag. The DHTML view is essentially a table that contains data that is provided by the XML document. Assume now that a user wishes to modify the purchase order by adding an additional product with a corresponding quantity and price. In the past, the solution to this problem might be to hardcode a function that added a specific "product tag" to the XML and then, correspondingly, to the DHTML view. This is a very inflexible solution that is tied specifically to the schema and tags of the XML document. In the described example, modification of the XML document takes place via the behavior or behaviors that are associated with the crystal 402. Specifically, the behavior that is defined for this particular XML tree structure includes the modifications that can be made to the XML document and a mapping that maps the changes to the DHTML view using application of XSL-T. This behavior is data shape-dependent and not schema- or data-dependent.

This is diagrammatically illustrated in FIG. 4 by the DHTML tree structure shown underneath the DHTML view 404. There, a node corresponding to the "product" node is shown adorned with a behavior. This behavior is binary code that enables a user to interact, via an appropriate UI (such as an in document "add product" button 411 attached to the table) with the DHTML view and have any defined modifications made by the user mapped back to the appropriate XML tree. When a user interacts with the DHTML view, the XML tree is structurally manipulated (as by adding the appropriate tags and structure), and then the XSL-T is invoked to redisplay the DHTML view.

In the purchase order example, assume that the user adds a new product to the DHTML view table by clicking on "add product" button 411 which adds a new row to table 410. In this example, when the new product is added, the behavior or binary code maps the modification back to the XML tree and incorporates the modification by making a structural change to the XML tree. In this specific example, the structural change would include adding a branch to the XML tree to represent the newly-added product. This added branch is shown as the dashed branch on the "Products" XML tree.

Consider the second XML tree 412 shown directly below the Products XML tree. That tree is an "Addresses" XML tree and is associated with addresses that might appear in an address book. This data is extremely different from the data that is associated with the Products XML tree. In fact, there is no relation at all between the data. Notice, however, that the Addresses XML tree has the same shape as the XML tree appearing directly above it. In the described embodiment, a similar crystal can be used to render a DHTML address book that contains entries for a name, street and zip code. The crystal would likely contain slightly different XSL-T for labeling purposes, but can contain the same exact behavior that was utilized in the above example to manipulate the structure of the Products XML tree. To this extent, a user interface button 411 is provided on the Address table and includes the same behavior as the user interface button associated with the Products table. Thus, when a user adds an entry to their address book, the behavior, or binary code, that is associated with the DHTML "Address" tag would ensure that any changes made to the DHTML view are mapped directly back to the corresponding XML document.

The crystals can advantageously be prepackaged software containers that include the behaviors that are specific to the shape of the data and not necessarily dependent upon the schema or specific data that may be contained by an XML document. This approach is very well suited to handling complex XSLT transformations which naturally flow from the robustness that XSL-T provides. By incorporating and associating behaviors in the DHTML tree, problems associated with handling complex XSLT transformations insofar as XML authoring is concerned are solved. This approach is extremely flexible and is not tied to any one schema or specific data, as were the solutions in the past. This approach also provides the application developer with the ability to develop complex XSL-T, without worrying about how the underlying XML is going to be manipulated responsive to a user manipulating the DHTML document. Further, because the approach utilizes crystals having behaviors that are specific to data shape and not specific to schema or data, the crystals are reusable across any XML documents that have shapes that correspond to the shapes for which the various crystals were designed.

Figure 5:
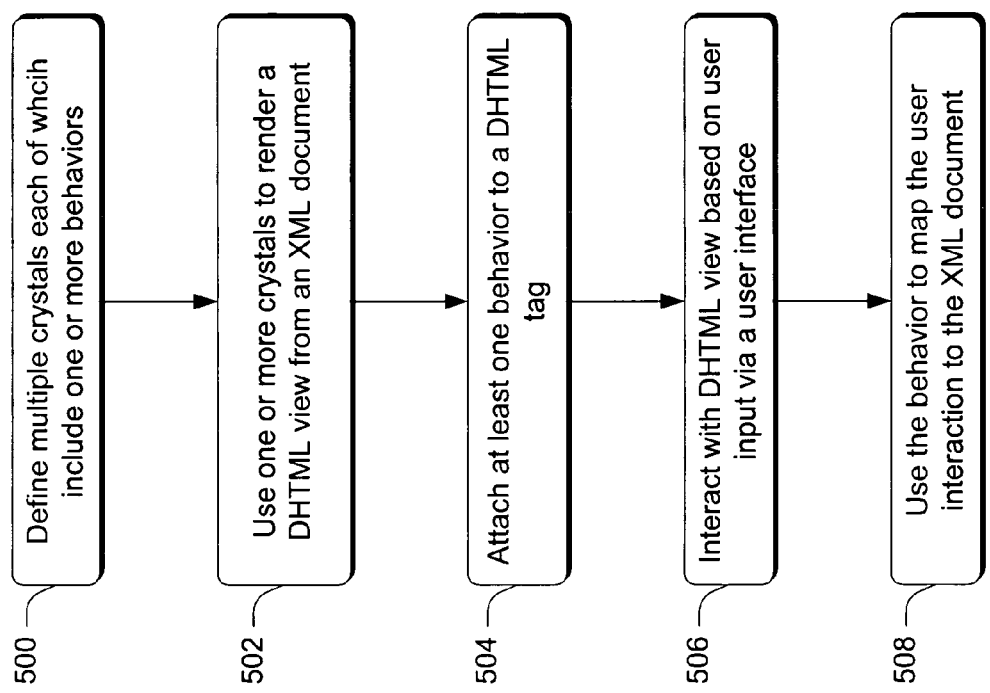
FIG. 5 is a flow diagram that describes steps in a method in accordance with one described embodiment.

FIG. 5 is a flow diagram that shows steps in a method in accordance with the embodiment described above. Step 500 defines multiple crystals each of which include one or more behaviors. In the described example, behaviors are implemented as binary code. The behaviors are specific to a data shape and do not depend on a schema or specific data. Step 502 uses one or more of the crystals to render a DHTML view from an XML document. Step 504 attaches at least one behavior to a DHTML tag. The behavior ensures that any modifications that are made to the DHTML view are mapped back to and appropriately change the XML document that contains the data in the DHTML view. Step 506 interacts with the DHTML view in some way, based upon user input via a UI. This step can be implemented by a user interacting with some type of structure, for example a table, within the DHTML view. Responsive to the user interaction with the DHTML view, step 508 uses the behavior to map the user's interaction back to the XML document and make the appropriate structural changes in the XML tree that contains the data. For example, the XML branch in FIG. 4 off of the "Products" node, indicated with a dashed line, might be the result of a user who adds a new product to the purchase order provided in the DHTML view.

EXAMPLE

The above approach is very flexible and can be conveniently used by application developers to provide applications. Assume that an independent software vendor (ISV) develops applications for end users and he wants to construct a purchase order. The ISV can select an appropriate XML schema for the purchase order which would then define the types of tags that the purchase order can contain. The ISV would need to write the appropriate XSL-T that could present the purchase order in DHTML in a ISV-defined manner. Perhaps the ISV wants to make the purchase order specific to a particular company. The XSL-T provides a way for the ISV to do this. That is, each ISV may wish to present their data differently in a way that is specific to the ISV. Thus, while they each may use the same schema, there will be many different instances of the schema each of which can be potentially very different from the others. One goal of the crystal-based implementation discussed above, is that it should be very easy for ISVs to develop applications based on XML. Accordingly, when the ISV writes their XSL-T, they can incorporate various behaviors that are provided by multiple different crystals. These crystals are predefined so that the ISV need not worry about defining them. They can simply select the crystals that are appropriate for their shape of data, and incorporate them with XSL-T. Now, when the XML is transformed into DHTML, user interactions with the DHTML view can be mapped to the underlying XML document.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method of manipulating an XML document comprising:
   defining one or more crystals, each of which containing one or more behaviors and an XSLT transformation for transforming an XML document into a DHTML view;
   using the one or more crystals to render a DHTML view from an XML document;
   enabling user interaction with the DHTML view; and
   mapping, via the one or more behaviors, user interactions in the DHTML view to the XML document.

2. The method of claim 1, wherein the one or more behaviors are data-shape dependent.

3. The method of claim 1, wherein the one or more behaviors are data-shape dependent on a data shape defined by the XML document.

4. The method of claim 1, wherein the one or more behaviors are configured to function independently of an XML schema of which the XML document is an instance.

5. The method of claim 1, wherein the one or more behaviors are configured to function independently of XML tags that might be used.

6. The method of claim 1, wherein the behaviors are implemented as binary code.

7. The method of claim 1, wherein the crystals are reusable across different XML documents.

8. One or more computer-readable media having computer-readable instructions thereon which, when executed by a computer, implement the method of claim 1.

9. One or more computer-readable media having computer-readable instructions thereon which, when executed by a computer, cause the computer to:
   provide multiple crystals, each of which containing one or more behaviors and an XSLT transformation for transforming an XML document into a DHTML view;
   use one or more of the crystals to render a DHTML view from an XML document;
   attach at least one behavior to at least one DHTML tag;
   ascertain that a user has interacted with a DHTML view associated with the at least one DHTML tag; and
   use the behavior associated with the at least one DHTML tag to map a user interaction back to the XML document and make associated structural changes in the XML document.

10. The one or more computer-readable media of claim 9, wherein the behaviors are implemented as binary code.

11. The one or more computer-readable media of claim 9, wherein the behaviors are data shape dependent.

12. The one or more computer-readable media of claim 9, wherein the behaviors are not dependent upon an XML schema.

13. A method of manipulating an XML document comprising: associating one or more behaviors with a DHTML tag in a DHTML view that has been rendered from an XML document, wherein the one or more behaviors are independent of data values; and responsive to a user interacting with a DHTML view associated with the DHTML tag, using the one or more behaviors to map user interactions to the XML document and effect structural changes on the XML document.

14. The method of claim 13, wherein the one or more behaviors are data shape-dependent.

15. The method of claim 13, wherein the one or more behaviors are data shape-dependent, the data shape being defined by the XML document.

16. The method of claim 13, wherein the one or more behaviors are independent of any XML schema.

* * * * *